US011258859B2

(12) United States Patent
Tjora

(10) Patent No.: US 11,258,859 B2
(45) Date of Patent: Feb. 22, 2022

(54) SYSTEMS AND METHODS FOR PAIRING NETWORK DEVICES

(71) Applicants: Disruptive Technologies Research AS, Blomsterdalen (NO); Oystein Moldsvor, Tiller (NO)

(72) Inventor: Sigve Tjora, Melhus (NO)

(73) Assignee: Disruptive Technologies Research AS, Lysaker (NO)

( * ) Notice: Subject to any disclaimer, the term of this patent is extended or adjusted under 35 U.S.C. 154(b) by 54 days.

(21) Appl. No.: 15/505,630

(22) PCT Filed: Aug. 24, 2015

(86) PCT No.: PCT/IB2015/001869
§ 371 (c)(1),
(2) Date: Feb. 22, 2017

(87) PCT Pub. No.: WO2016/027167
PCT Pub. Date: Feb. 25, 2016

(65) Prior Publication Data
US 2017/0272522 A1    Sep. 21, 2017

Related U.S. Application Data

(60) Provisional application No. 62/040,614, filed on Aug. 22, 2014.

(51) Int. Cl.
*H04L 29/08* (2006.01)
*H04L 67/141* (2022.01)
(Continued)

(52) U.S. Cl.
CPC ............ *H04L 67/141* (2013.01); *H04L 63/08* (2013.01); *H04L 63/0869* (2013.01);
(Continued)

(58) Field of Classification Search
CPC ..... H04L 63/0869; H04L 67/18; H04W 12/06
(Continued)

(56) References Cited

U.S. PATENT DOCUMENTS 7,907,901 B1    3/2011  Kahn et al.
10,051,112 B2 *  8/2018  Yun .................... G06K 9/00892
(Continued)

FOREIGN PATENT DOCUMENTS

EP          933988 A1    10/2015
WO     2014091944 A1     6/2014

OTHER PUBLICATIONS

Preliminary Report on Patentability for related International Application No. PCT/IB2015/001869; report dated Mar. 9, 2017.

*Primary Examiner* — Teshome Hailu
(74) *Attorney, Agent, or Firm* — Onyx IP Group

(57) ABSTRACT

A method for pairing a first network device with a second network device is provided. The method may include receiving a first signal corresponding to a first pairing sequence received at the first network device, receiving a second signal corresponding to a second pairing sequence received at the second network device, comparing the first pairing sequence with the second pairing sequence, and pairing the first network device and the second network device when the second pairing sequence correlates to the first pairing sequence.

20 Claims, 3 Drawing Sheets

(51) Int. Cl.
*H04W 12/06* (2021.01)
*H04L 29/06* (2006.01)
*H04W 12/50* (2021.01)
*H04L 67/12* (2022.01)
*H04L 67/52* (2022.01)
*H04W 12/68* (2021.01)

(52) U.S. Cl.
CPC .............. *H04L 67/12* (2013.01); *H04L 67/18* (2013.01); *H04W 12/06* (2013.01); *H04W 12/50* (2021.01); *H04W 12/68* (2021.01)

(58) Field of Classification Search
USPC .......................................................... 726/3
See application file for complete search history.

(56) References Cited

U.S. PATENT DOCUMENTS

| | | | |
|---|---|---|---|
| 10,419,428 B2 * | 9/2019 | Tunnell | H04L 9/3234 |
| 2012/0254987 A1 | 10/2012 | Ge et al. | |
| 2012/0317297 A1 | 12/2012 | Bailey | |
| 2012/0324559 A1 | 12/2012 | Ran et al. | |
| 2013/0326583 A1 * | 12/2013 | Freihold | G06F 21/32 |
| | | | 726/3 |
| 2014/0006954 A1 * | 1/2014 | Raffa | G06F 3/04883 |
| | | | 715/733 |
| 2014/0223549 A1 * | 8/2014 | Quintanilla | G06F 21/31 |
| | | | 726/19 |
| 2014/0235166 A1 | 8/2014 | Molettier et al. | |
| 2015/0113599 A1 * | 4/2015 | Curtis | H04L 63/0428 |
| | | | 726/4 |
| 2015/0249920 A1 * | 9/2015 | Lestario | H04W 12/50 |
| | | | 455/411 |

* cited by examiner

SYSTEMS AND METHODS FOR PAIRING NETWORK DEVICES

CROSS-REFERENCE TO RELATED APPLICATION

This Application is a 35 USC § 371 US National Stage filing of International Application No. PCT/IB2015/001869 filed on Aug. 24, 2015, and claims priority under the Paris Convention to U.S. Provisional Patent Application No. 62/040,614 filed on Aug. 22, 2014.

TECHNICAL FIELD

The present disclosure relates generally to communication networks, and more particularly, to systems and methods for pairing devices within a network.

BACKGROUND

Communication networks are generally formed between one or more network devices, such as nodes, relay nodes, gateways, network servers, and the like, which electrically communicate with one another through wired or wireless connections. For instance, nodes can communicate directly with other nodes or gateways, indirectly with other nodes or gateways via relay nodes, indirectly with network servers via gateways, or the like. In order to establish such a network, each network device must be registered or paired to the network in a manner which not only authorizes connectivity and access to the network device, but in a manner which may also establish secured or encrypted links with the network device. While conventional pairing techniques may be adequate in less complex applications, there is still much room for improvement particularly with respect to the ease of use.

In one conventional approach, devices are paired to a network by manually applying the appropriate settings directly onto each individual device. This procedure may be adequate for pairing a typical computing device, or any other device with a more elaborate user interface through which such settings can be manually entered. This approach, however, can be cumbersome in much larger network environments which require manual registrations of several different network devices. Furthermore, this manual approach cannot be used to pair embedded devices, such as Internet of Things (IoT) devices, which may lack more elaborate user interfaces for manually entering network settings.

To overcome such setbacks, some gateways are enabled with features, such as WiFi Protected Setup (WPS), or the like, that provide a limited timeframe or pairing window within which network devices in the vicinity of the gateway, including embedded devices, can be openly paired to the network. The pairing window is typically initiated by pressing or triggering a physical button or switch located on the gateway itself. However, due to the ease of initiating the pairing window and the openness of the access that is allowed during this window, physical access to the gateway must be heavily guarded. Even still, network security is susceptible to any hostile devices within the vicinity of the gateway that are continuously waiting for the next pairing window to open.

Yet another approach uses Quick Response (QR) codes which are printed and affixed onto the exterior of individual network devices. Pairing is performed by taking a photo of the QR code with a camera of the device to be registered. This approach is easier to perform than the manual method because it bypasses the need to enter the appropriate settings into individual network devices, and is also more secure than the pairing window approach because it requires unique QR codes and physical presence to complete the pairing process. In order to properly scan the QR codes, however, the dimensions of each QR code have to meet minimum dimensions to be readable, which thereby precludes the use of any minimally sized nodes having external dimensions that are smaller than the smallest allowable QR codes.

In view of the foregoing setbacks and disadvantages associated with conventional pairing approaches, a need therefore exists for an improved pairing method or system that is not only secure and easily performed, but also capable of efficiently and securely pairing embedded devices which may be much smaller in size and provided without user interfaces.

SUMMARY OF THE DISCLOSURE

In one aspect of the present disclosure, a method of pairing a first network device with a second network device is provided. The method may include receiving a first signal corresponding to a first pairing sequence received at the first network device, receiving a second signal corresponding to a second pairing sequence received at the second network device, comparing the first pairing sequence with the second pairing sequence, and pairing the first network device and the second network device when the second pairing sequence correlates to the first pairing sequence.

In another aspect of the present disclosure, a pairing system is provided. The pairing system may include at least a control device, a node device, and a network server. The control device may be configured to receive a first pairing sequence, and generate a first signal corresponding to the first pairing sequence. The node device may be configured to receive a second pairing sequence, and generate a second signal corresponding to the second pairing sequence. The network server may be configured to receive each of the first signal and the second signal, compare the first pairing sequence with the second pairing sequence, and pair the control device and the node device when the second pairing sequence correlates with the first pairing sequence within predefined thresholds.

In yet another aspect of the present disclosure, a network device is provided. The network device may include at least a sensor module, and a control module. The sensor module may be configured to detect a pairing sequence, and convert the pairing sequence into a signal. The control module may be configured to receive the signal, transmit the signal to a network server, and establish a network connection with one or more successfully paired network devices.

DETAILED DESCRIPTION

Figure 1:
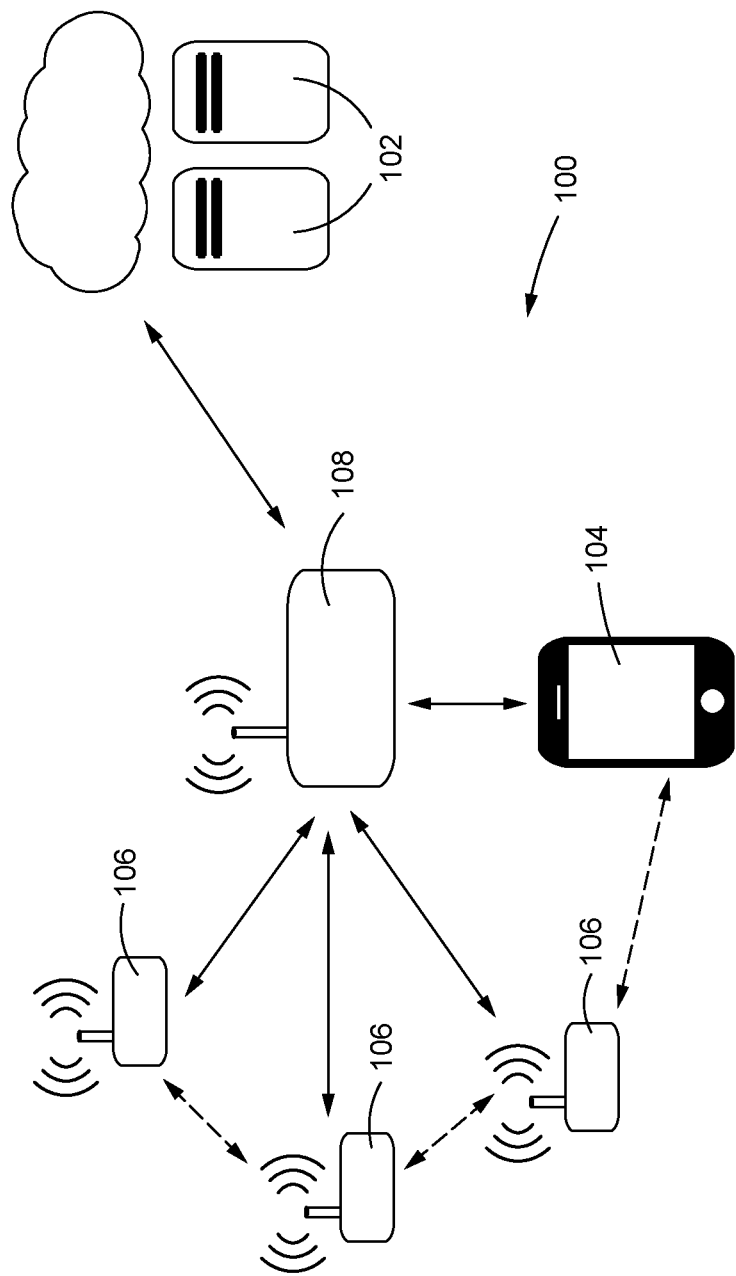
FIG. 1 is a diagrammatic illustration of one exemplary pairing system that is implemented within a network and constructed in accordance with the teachings of the present disclosure.

Referring now to FIG. 1, one exemplary embodiment of a pairing system 100 that may be used to establish one or more communication networks is provided. As shown, the pairing system 100 may generally include one or more network servers 102, such as cloud servers, and the like, which communicate with one or more network devices, such as control devices 104, node devices 106, gateways 108, and the like. More specifically, each of the network devices 104, 106, 108 may be capable of communicating with one another and/or with the servers 102 through wired and/or wireless connections. For example, each of the control devices 104 and the node devices 106 may be able to communicate directly with the server 102 and/or indirectly with the server 102 via intermediate connections using gateways 108, relay nodes, or the like. Each of the control devices 104 and the node devices 106 may also communicate with one another via paired connections once successfully established.

Figure 2:
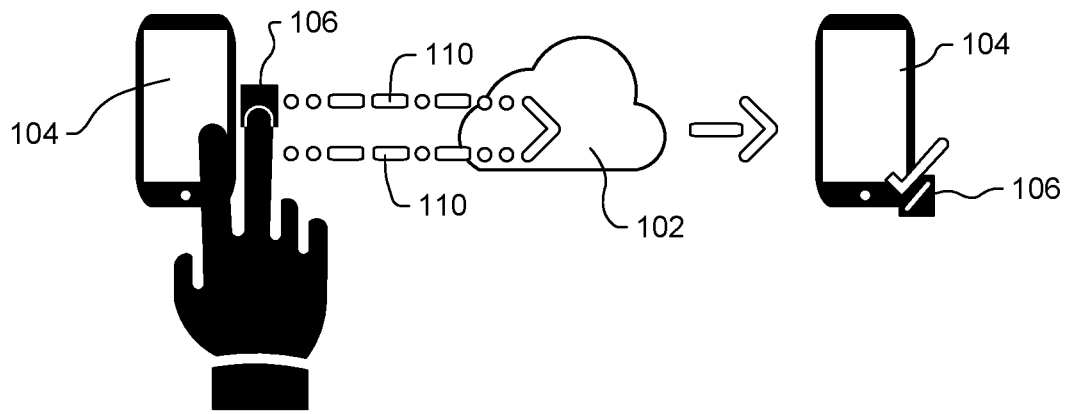
FIG. 2 is a diagrammatic illustration of one exemplary pairing procedure being performed between a control device and an embedded node.

Turning to FIG. 2, one exemplary pairing procedure being performed between a control device 104 and a node device 106 is illustrated. In the particular embodiment shown, the control device 104 is depicted as a smartphone, the node device 106 is depicted as an embedded node, such as an Internet of Things (IoT) device, and the network server 102 is depicted as a cloud server. However, it will be understood that each of the control device 104 and the node device 106 may represent other network-capable devices, and that the server 102 may represent other types of network servers. For example, the control device 104 and the node device 106 may include, not only smartphones and IoT devices, but alternatively, desktop or laptop computers, tablet devices, portable gaming devices, portable media devices, and/or any other mobile or stationary device capable of network connectivity.

In the example of FIG. 2, the pairing system 100 of FIG. 1 may enable a control device 104 to establish a secured network or a paired connection with a node device 106 using a much more simplified pairing procedure. As demonstrated in FIG. 2, each of the control device 104 and the node device 106 may first be located, not only within communication range of one another, but also within communication range of the servers 102 or associated gateways 108. Additionally, network connectivity between the servers 102 and each of the control device 104 and the node device 106 may be established individually prior to performing a pairing procedure. In the case of the control device 104 of FIG. 2, or devices such as smartphones with more elaborate user interfaces, user or user account authentication may be required by the servers 102 in order to complete the connection with the servers 102. In the case of the node device 106, or embedded nodes such as IoT devices, authentication may not be necessary and connection with the servers 102 may be sufficient so long as the node device 106 is turned on and within range.

Once individual connections from each of the control device 104 and the node device 106 to the servers 102 have been established, the control device 104 and the node device 106 may be paired together as shown in FIG. 2. More specifically, each of the control device 104, the node device 106 and the servers 102 may be provided with means to receive and recognize a pairing sequence 110 that is provided by an authorized user. The pairing sequence 110 may be input by the user in any suitable form that is recognizable by the control device 104 and the node device 106. For example, the pairing sequence 110 may be composed of sequences of gestures or touch input, pressure input, motion-based input, light or visual input, audio input, or any other suitable input that is receivable or recognizable by the control device 104 and the node device 106. In the particular pairing procedure shown in FIG. 2, the user may simultaneously tap on each of the control device 104 and the node device 106 to begin the pairing procedure.

By simultaneously tapping on both of the control device 104 and the node device 106, for instance, using one hand, the tapping sequences 110 received by each of the control device 104 and the node device 106 may be substantially the same in terms of the duration of the tapping sequences 110, the number of taps within the tapping sequences 110, the frequency of taps within the tapping sequences 110, the relative timing of the taps within the tapping sequences 110, the interval between taps within the tapping sequences 110, the duration of the taps within the tapping sequence 110, and the like. In response, each of the control device 104 and the node device 106 may substantially simultaneously generate and transmit signals, such as electrical or other communicable signals, corresponding to the tapping sequences 110 to the servers 102. Upon examining the signals, the servers 102 may compare the underlying tapping sequences 110 relative to predefined thresholds to determine whether the tapping sequences 110 transmitted by the node device 106 is in substantial agreement or correlation with the tapping sequences 110 transmitted by the control device 104.

As shown still in FIG. 2, if the servers 102 determine that the tapping sequences 110 received by the control device 104 and the node device 106 are substantially the same, the servers 102 may deem a successful pairing and enable communications of information therebetween. In one example, the servers 102 may transmit a pairing confirmation signal, or any other suitable communicable signal, to one or both of the control device 104 and the node device 106 which enables one or both of the control device 104 and the node device 106 to be directly associated with the other. If, however, the servers 102 determine that the tapping sequences 110 are not in substantial agreement with one another, for example, if differences between the tapping sequences 110 exceed predefined thresholds, the servers 102 may cease further actions or transmit appropriate signals which deny or prevent pairing between the control device 104 and the node device 106. Although demonstrated using two network devices 104, 106, it will be understood that the pairing procedure may be simultaneously performed between any number of different network devices 104, 106, 108.

Figure 3:
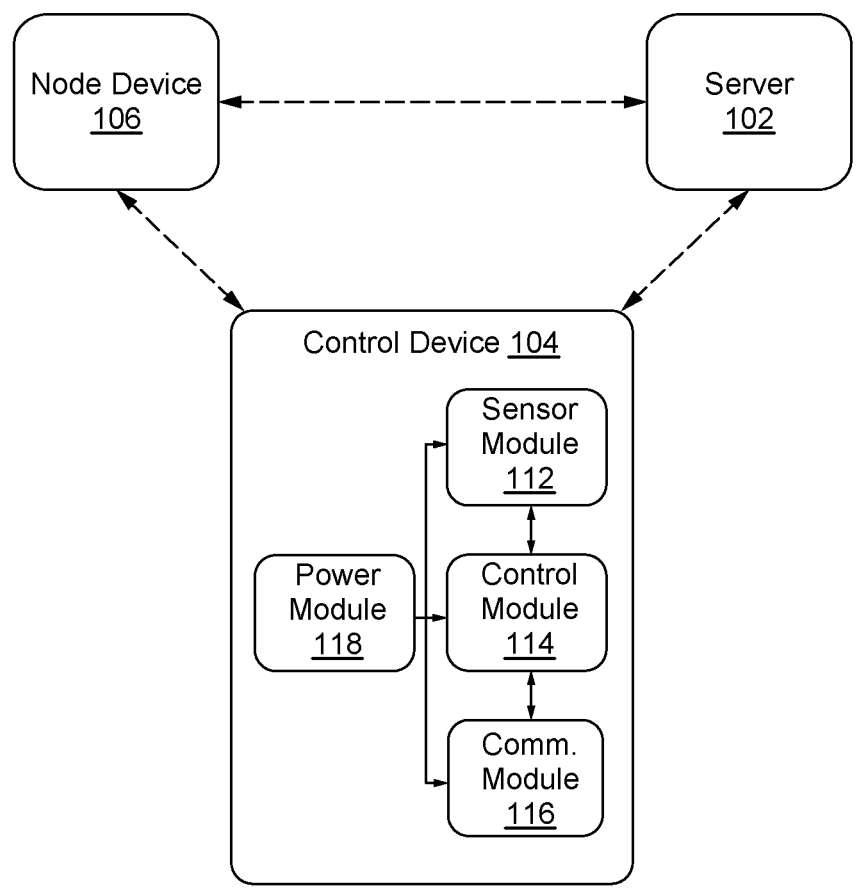
FIG. 3 is a diagrammatic illustration of one exemplary network device that may be used in conjunction with the pairing methods and systems of the present disclosure.

Turning to FIG. 3, one exemplary schematic of a network device, such as a control device 104, is provided. Moreover, each of the modular components described may be representative of hardware, software, or combinations thereof, that are configured to perform one or more functions of the control device 104. The control device 104 of FIG. 3, for example, can be preprogrammed according to one or more algorithms that may be generally be categorized into at least a sensor module 112, a control module 114, a communication module 116, and a power module 118. While only one possible schematic of the control device 104 is provided, it will be understood that the control device 104 may additionally or alternatively be composed of other modules or other arrangements of modules capable of producing comparable results. Furthermore, although the primary embodiment shown is that of the control device 104, it will be understood that the modules thereof may also be representative of at least some of the components that are similarly implemented within the node device 106, the gateway 108, and any other network-capable device within the pairing system 100.

Still referring to FIG. 3, the sensor module 112 of the control device 104 may include one or more sensing mechanisms configured to detect the pairing sequence 110 in one or more forms of touch input, pressure input, motion-based input, visual input, audio input, and the like. For example, the sensor module 112 may include or operatively communicate with one or more capacitive sensors, proximity sensors, pressure sensors, motion sensors, photodiodes or other light sensors, cameras, microphones, temperature or other environmental sensors, or any other sensing mechanism capable of detecting user input. In alternative embodiments, the sensor module 112 may include or operatively communicate with switches, buttons, dials, knobs, or the like. In the pairing system 100 of FIG. 2, for instance, the sensor module 112 may be configured to detect a tapping sequence 110, and convert the tapping sequence 110 into a corresponding signal containing information relating to one or more of the duration of the tapping sequence 110, the number of taps within the tapping sequence 110, the frequency of taps within the tapping sequence 110, the relative timing of the taps within the tapping sequence 110, the interval of taps within the tapping sequence 110, the duration of the taps within the tapping sequence 110, and the like.

In addition, the control module 114 of FIG. 3 may include one or more controllers or processors that are operatively coupled to at least each of the sensor module 112 and the communication module 116. More specifically, the control module 114 may be configured to receive signals generated by the sensor module 112 corresponding to underlying pairing sequences 110, and transmit the signals to servers 102 during a pairing event. If the servers 102 find a successful pairing with the control device 104, the control module 114 may also be configured to receive a pairing confirmation signal, or the like, from the servers 102 indicative of the successful pairings, and establish a connection or other association with the successfully paired device, such as the node device 106 of FIG. 3, based on information contained within the pairing confirmation signal. For example, the pairing confirmation signal may include information relating to one or more of the identification of the paired node device 106, the type or protocol of the established network connection, the type of encryption used for the network connection, and the like.

Additionally or optionally, the control device 104 may be provided with the communication module 116 of FIG. 3 that may be used by the control module 114 to interface with other network devices 104, 106, 108 and the servers 102. For example, the communication module 116 may include one or more antennas configured to wirelessly communicate signals with the network servers 102 and/or with a successfully paired node device 106. Moreover, the communication module 116 may be configured to transmit or receive any signal to or from connected or paired network devices 104, 106, 108 and servers 102 using any protocol commonly used in the relevant art. Furthermore, the control device 104 may be provided with the power module 118 of FIG. 3, which may include a power source, such as a battery, ultracapacitor, or other type of energy storage device. Moreover, the power module 118 may be configured to manage the power supplied by the power source, and communicate appropriate power to each of the sensor module 112, the control module 114, the communication module 116, and any other components that may be provided within the control device 104.

Figure 4:
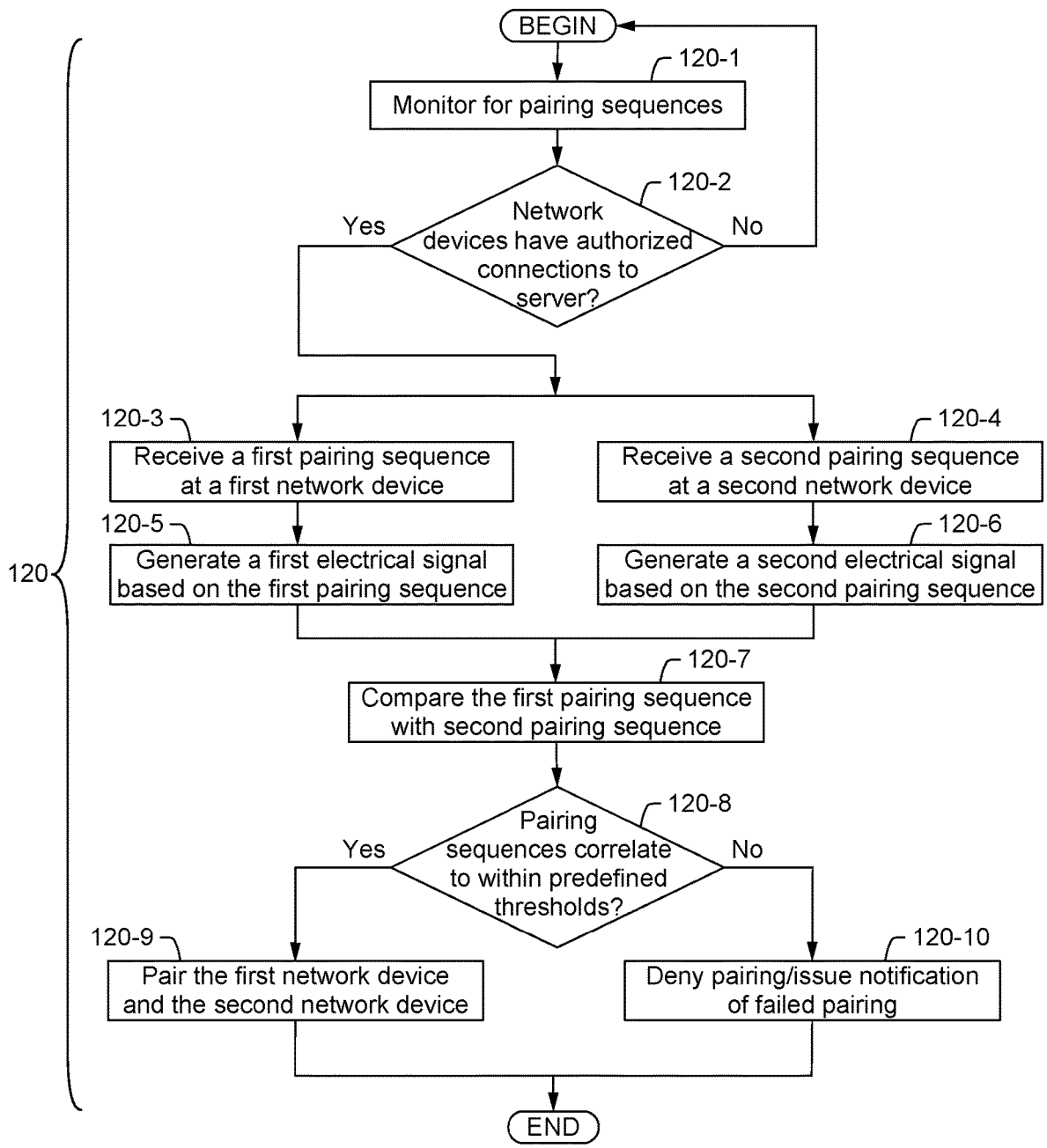
FIG. 4 is a flowchart of one exemplary pairing method that is designed in accordance with the teachings of the present disclosure.

Turning now to FIG. 4, one exemplary algorithm or controller-implemented method 120 for pairing two or more network devices 104, 106, 108 is diagrammatically provided, according to which the pairing system 100, or any combination of the network devices 104, 106, 108 thereof, may be configured to operate. As shown in block 120-1 of FIG. 4, the pairing system 100 may be configured to initially monitor, such as intermittently, periodically or continuously, for pairing sequences 110 provided by two or more network devices 104, 106, 108 having connectivity with the relevant servers 102. It will be understood that more elaborate modifications of the initial monitoring or recognition process may also be implemented as desired and as applicable. In substantially larger network applications, for instance, the number of incoming pairing sequences 110 being simultaneously received from different geographical regions may far exceed the capacity of a given set of servers 102 to properly correlate and process the pairing sequences 110. In such settings, the servers 102 may be configured to filter, segregate, regionalize, localize and/or otherwise categorize the corresponding signals into more manageable numbers, such as based on the originating Internet Protocol (IP) address, or any other localization techniques. Additionally or optionally, as shown in block 120-2, network devices 104, 106, 108 with more elaborate user interfaces, the pairing system 100 may additionally check to see if network access is authorized by the associated user or user account as shown in block 120-2 before proceeding with the pairing procedure.

Once two or more network devices, such as two or more of a control device 104, a node device 106 and a gateway 108, are within communication range of one another and/or with the relevant network servers 102, the pairing system 100 may be configured to receive pairing sequences 110 via each of the respective network devices 104, 106, 108 as shown in blocks 120-3 and 120-4. In the example of FIG. 2, an authorized user may begin a pairing procedure by substantially simultaneously tapping on both of the first network device 104 and the second network device 106 to generate the first and second tapping sequences 110 shown. It will be understood that other forms of pairing sequences 110 can be employed to achieve comparable results. For example, depending on the capabilities of the sensing mechanisms within each of the first network device 104 and the second network device 106, the pairing sequence 110 may be composed of a series of user input received in the form of gestures or touch input, pressure input, motion-based input, light or visual input, audio input, or the like.

Upon receiving the respective pairing sequences 110, each of the first network device 104 and the second network device 106 may be configured to generate respective first and second signals as shown in blocks 120-5 and 120-6 of FIG. 4. In the example of FIG. 2, for instance, each of the first network device 104 and the second network device 106 may be able to recognize the series of physical taps thereon using a sensing mechanism that is capable of detecting any one or more of gestures or touch input, pressure input, motion-based input, light or visual input, audio input, and the like. Moreover, the sensing mechanism of the first network device 104 may convert the detected tapping sequence 110 into a corresponding first signal that is representative of the underlying first tapping sequence 110 in block 120-5. Similarly, the sensing mechanism of the second network device 106 may convert the detected tapping sequence 110 into a corresponding second signal that is representative of the underlying second tapping sequence 110 in block 120-6.

Once both of the first signal and the second signal are generated, each of the first network device 104 and the second network device 106 may transmit the respective signals to one or more network servers 102 for further analyses as shown in block 120-7 of FIG. 4. Correspondingly, the servers 102 may monitor for any two or more signals that are simultaneously received within a common timeframe, and compare the underlying pairing sequences 110 of such signals for agreements or correlations which may suggest an authorized pairing request. As shown in block 120-8 of FIG. 4, for example, the servers 102 may determine whether correlations between the received pairing sequences 110 are within acceptable predefined thresholds before confirming a successful pairing between the respective network devices 104, 106, 108. Using the example of FIG. 2, for instance, the servers 102 may monitor for correlations in terms of the duration of the tapping sequences 110, the number of taps within the tapping sequences 110, the frequency of taps within the tapping sequences 110, the relative timing of the taps within the tapping sequences 110, the interval between taps within the tapping sequences 110, the duration of the taps within the tapping sequences 110, or the like.

Using the arrangement shown in FIG. 2 as an example, if the first tapping sequence 110 detected by the control device 104 included ten taps, and if the second tapping sequence 110 detected by the node device 106 also included ten taps, the servers 102 may confirm a successful pairing, assuming no other attributes are also being examined. If predefined thresholds are employed, some relatively insignificant deviations may be allowed. For example, if the first tapping sequence 110 included ten taps, and if the second tapping sequence 110 included nine taps, the servers 102 may still deem that nine correlating taps are sufficient for confirming a successful pairing. If, however, the first tapping sequence 110 included ten taps, and if the second tapping sequence 110 included two taps, the servers 102 may conclude that two out of ten taps are insufficient correlations to consider the pairing as successful. While this is only one possible implementation of block 120-8 of FIG. 4, it will be understood that other types of predefined thresholds can be similarly used to produce comparable results. Furthermore, the predefined threshold may also be adjusted based on the desired pairing application and/or network setting.

Still referring to FIG. 4, if correlations between the pairing sequences 110 are determined to be within acceptable thresholds, the servers 102 may proceed to pair, or confirm successful pairing between, the two or more network devices 104, 106, 108 according to block 120-9. Optionally, in one configuration, the servers 102 may further transmit a pairing confirmation signal, or any other suitable signal, to one or all of the network devices 104, 106, 108 which enables network connectivity therebetween. The nature of the pairing process in block 120-9 may take one of many forms commonly used in the art, and essentially, may establish direct or indirect network connectivity between the network devices 104, 106, 108 or authorize a pre-established network connection therebetween. If, however, correlations between the pairing sequences 110 are not within acceptable thresholds, the servers 102 may cease further action or deny pairing between the network devices 104, 106, 109 according to block 120-10. Optionally, the servers 102 may further generate and issue alerts or notifications to the relevant and authorized users to indicate a failed pairing attempt for added security.

From the foregoing, it will be appreciated that while only certain embodiments have been set forth for the purposes of illustration, other alternatives and modifications will be apparent from the above description to those skilled in the art. These and other alternatives are considered equivalents and within the spirit and scope of this disclosure and the appended claims.

What is claimed is:

1. A method of pairing a first network device with a second network device, the method comprising:
   receiving, by a server comprising one or more processors, a first signal corresponding to a first pairing sequence received at the first network device, wherein the first pairing sequence includes a first tapping sequence;
   receiving, by the server, a second signal corresponding to a second pairing sequence received at the second network device, wherein the second pairing sequence includes a second tapping sequence;
   comparing, by the server, the first pairing sequence and the second pairing sequence based on a threshold, wherein the threshold is defined based on a duration of the first tapping sequence and a duration of the second tapping sequence, a number of taps in the first tapping sequence and a number of taps in the second tapping sequence, a frequency of taps in the first tapping sequence and a frequency of taps in the second tapping sequence, and an interval between taps in the first tapping sequence and an interval between taps in the second tapping sequence;
   determining, by the server, that the second pairing sequence correlates to the first pairing sequence based on comparing the first pairing sequence and the second pairing sequence; and
   pairing, by the server, the first network device and the second network device based on determining that the second pairing sequence correlates to the first pairing sequence.

2. The method of claim 1, wherein each of the first pairing sequence and the second pairing sequence is correspondingly received at the first network device and the second network device based on one or more of touch input, pressure input, motion-based input, visual input, and audio input.

3. The method of claim 1, wherein each of the first network device and the second network device is located within a predefined proximity of one another.

4. The method of claim 1, further comprising:
   authenticating individual connections between each of the first network device and the second network device and the server.

5. The method of claim 4, wherein the server includes a cloud service.

6. The method of claim 1, wherein one or more of the first network device or the second network device include an Internet of Things (IoT) device.

7. The method of claim 1, wherein the first tapping sequence and the second tapping sequence are generated simultaneously based on simultaneous taps on the first network device and the second network device.

8. The method of claim 1, wherein the threshold is defined further based on a relative timing of taps in the first tapping sequence and a relative timing of taps in the second tapping sequence.

9. A pairing system, comprising:
   a control device including one or more processors configured to:
      receive a first pairing sequence, and generate a first signal corresponding to the first pairing sequence, wherein the first pairing sequence includes a tapping sequence;

a node device including one or more processors configured to:

receive a second pairing sequence, and generate a second signal corresponding to the second pairing sequence, wherein the second pairing sequence includes a tapping sequence; and a network server including one or more processors configured to:

receive the first signal and the second signal, compare the first pairing sequence and the second pairing sequence based on a threshold, wherein the threshold is defined based on a duration of the first tapping sequence and a duration of the second tapping sequence, a number of taps in the first tapping sequence and a number of taps in the second tapping sequence, a frequency of taps in the first tapping sequence and a frequency of taps in the second tapping sequence, and an interval between taps in the first tapping sequence and an interval between taps in the second tapping sequence, determine that the second pairing sequence correlates to the first pairing sequence based on comparing the first pairing sequence and the second pairing sequence, and pair the control device and the node device based on determining that the second pairing sequence correlates with the first pairing sequence.

10. The pairing system of claim 9, wherein each of the control device and the node device includes a sensing mechanism configured to detect the first pairing sequence and the second pairing sequence in one or more forms of touch input, pressure input, motion-based input, visual input, and audio input.

11. The pairing system of claim 9, wherein each of the control device and the node device is located within a predefined proximity of the network server.

12. The pairing system of claim 9, wherein the control device includes at least one user interface capable of authenticating a user account with the network server.

13. The pairing system of claim 9, wherein the node device includes an Internet of Things (IoT) device.

14. The pairing system of claim 9, wherein the network server includes a cloud service.

15. The pairing system of claim 9, wherein the first tapping sequence and the second tapping sequence are generated simultaneously based on simultaneous taps on the control device and the node device.

16. The pairing system of claim 9, wherein the threshold is defined further based on a relative timing of taps in the first tapping sequence and a relative timing of taps in the second tapping sequence.

17. A network device, comprising:

a sensor module configured to:

detect a pairing sequence that includes a first tapping sequence, and convert the pairing sequence into a signal; and a control module including one or more processors configured to:

receive the signal, transmit the signal to a network server, and establish a network connection with one or more network devices when the one or more network devices are successfully paired with the network device, wherein the one or more network devices are successfully paired with the network device based on a duration of the first tapping sequence and a duration of one or more second tapping sequences generated by the one or more network devices, a number of taps in the first tapping sequence and a number of taps in the one or more second tapping sequences, a frequency of taps in the first tapping sequence and a frequency of taps in the one or more second tapping sequences, and an interval between taps in the first tapping sequence and an interval between taps in the one or more second tapping sequences.

18. The network device of claim 17, wherein the sensor module is configured to detect the pairing sequence in one or more forms of touch input, pressure input, motion-based input, visual input, and audio input.

19. The network device of claim 17, wherein the sensor module is configured to detect the pairing sequence as the first tapping sequence, and convert the first tapping sequence into the signal, wherein the signal includes information relating to one or more of the duration of the first tapping sequence, the number of taps in the first tapping sequence, the frequency of taps in the first tapping sequence, a relative timing of taps in the first tapping sequence, the interval between taps in the first tapping sequence, and a duration of taps in the first tapping sequence.

20. The network device of claim 17, wherein the control module is further configured to receive a pairing confirmation signal from the network server indicative of one or more successful pairings, the pairing confirmation signal including information relating to one or more of an identification of the one or more network devices, a type of network connection established with the one or more network devices, and a type of encryption used for the network connection.

* * * * *